United States Patent
Ireland et al.

(10) Patent No.: US 10,245,845 B2
(45) Date of Patent: Apr. 2, 2019

(54) OBJECT HOLDER FOR A DIRECT-TO-OBJECT PRINTER

(71) Applicant: XEROX Corporation, Norwalk, CT (US)

(72) Inventors: Jonathan Ireland, Lancaster, PA (US); Michael N. Soures, Webster, NY (US); Bruce H. Smith, Webster, NY (US); Donald E. Thresh, Fairport, NY (US); James D. Vanbortel, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/477,375

(22) Filed: Apr. 3, 2017

(65) Prior Publication Data

US 2018/0281463 A1    Oct. 4, 2018

(51) Int. Cl.
| | |
|---|---|
| *G06K 7/10* | (2006.01) |
| *G06K 7/14* | (2006.01) |
| *B41J 3/407* | (2006.01) |
| *G06K 19/06* | (2006.01) |
| *G06K 19/07* | (2006.01) |

(52) U.S. Cl.
CPC ........ *B41J 3/4073* (2013.01); *G06K 7/10366* (2013.01); *G06K 7/1413* (2013.01); *G06K 19/06028* (2013.01); *G06K 19/0723* (2013.01)

(58) Field of Classification Search
CPC .............................. B23Q 1/035; B41J 3/4073
See application file for complete search history.

(56) References Cited

U.S. PATENT DOCUMENTS

| | | | | | |
|---|---|---|---|---|---|
| 5,305,992 | A | * | 4/1994 | Kish ...................... | B23Q 1/035 |
| | | | | | 269/228 |
| 6,022,033 | A | * | 2/2000 | Landesman ............. | B62B 3/006 |
| | | | | | 280/47.35 |

(Continued)

FOREIGN PATENT DOCUMENTS

| | | | | | |
|---|---|---|---|---|---|
| WO | WO 2007010355 | * | 1/2007 | ............. | B23Q 1/035 |
| WO | WO 2011064349 | * | 6/2011 | ............. | B23Q 1/035 |
| WO | WO 2015109320 | * | 7/2015 | ............. | B41J 3/407 |

OTHER PUBLICATIONS

U.S. Appl. No. 15/163,880, filed May 25, 2016.

(Continued)

*Primary Examiner* — Julian D Huffman
(74) *Attorney, Agent, or Firm* — Philip E. Blair; Fleit Gibbons Gutman Bongini & Bianco P.L.

(57) ABSTRACT

What is disclosed is an object holder for securely retaining an object while it is being printed in a direct-to-object print system and a direct-to-object print system configured to use various embodiments of the object holder of the present invention. In one embodiment, the object holder comprises a shuttle mount configured to slideably traverse a support member positioned parallel to a plane formed by at least one printhead configured to eject in onto a surface of an object. The mount has a plurality of receptacles, each has a shape for receiving a retainer in one of a plurality of orientations. A head of each retainer is shaped to retain an edge of the object on the mount. A base of each retainer is shaped such that, when the base is pressed into a receptacle, the head assumes a desired orientation. The removable retainers retain the object on the shuttle mount.

17 Claims, 8 Drawing Sheets

(56) References Cited

U.S. PATENT DOCUMENTS

| | | | | |
|---|---|---|---|---|
| 6,264,187 B1* | 7/2001 | Hertz | ............... | B23Q 1/035 |
| | | | | 269/21 |
| 9,925,799 B1* | 3/2018 | Fromm | ............... | B41J 3/4073 |
| 9,956,788 B2* | 5/2018 | Padilla | ............... | B41J 3/4073 |
| 2002/0056378 A1* | 5/2002 | Dorner | ............... | B41F 17/28 |
| | | | | 101/35 |
| 2008/0252711 A1* | 10/2008 | Martinez | ............... | B41J 3/4073 |
| | | | | 347/110 |
| 2009/0039742 A1* | 2/2009 | Ripley, Jr. | ............... | A47F 3/004 |
| | | | | 312/114 |
| 2013/0017330 A1* | 1/2013 | Padilla | ............... | B41M 5/0047 |
| | | | | 427/256 |

OTHER PUBLICATIONS

U.S. Appl. No. 15/477,631, filed Apr. 3, 2017.
U.S. Appl. No. 15/477,580, filed Apr. 3, 2017.
U.S. Appl. No. 15/477,502, filed Apr. 3, 2017.
U.S. Appl. No. 15/477,448, filed Apr. 3, 2017.
U.S. Appl. No. 15/477,404, filed Apr. 3, 2017.
U.S. Appl. No. 15/477,292, filed Apr. 3, 2017.
U.S. Appl. No. 15/477,181, filed Apr. 3, 2017.
U.S. Appl. No. 15/477,198, filed Apr. 3, 2017.
U.S. Appl. No. 15/582,817, filed May 1, 2017.
U.S. Appl. No. 15/621,450, filed Jun. 13, 2017.

* cited by examiner

OBJECT HOLDER FOR A DIRECT-TO-OBJECT PRINTER

TECHNICAL FIELD

The present invention is directed to a printing system for depositing ink directly on to a surface of an object and, more particular, to a device which securely retains an object in the direct-to-object print system while the object is being printed on.

BACKGROUND

Printers known in the document reproduction arts apply a marking material, such as ink or toner, onto a sheet of paper. To print something on an object that has a non-negligible depth such as a coffee cup, bottle, and the like, typically a label is printed and the printed label is applied to the surface of the object. However, in some manufacturing and production environments, it is desirable to print directly on the object itself but this poses a diverse set of hurdles which must be overcome before such specialized direct-to-object print systems become more widely accepted in commerce. One of these hurdles is how to secure the object in such a specialized printer while the object is being printed. Such direct-to-object print systems have a component often referred to as an object holder. The present invention is specifically directed to an object holder for use in a direct-to-object print system designed to print directly on a surface of an object.

BRIEF SUMMARY

What is disclosed is an object holder for securely retaining an object while it is being printed in a direct-to-object print system and a direct-to-object print system configured to use various embodiments of the object holder of the present invention. In one embodiment, the object holder comprises a shuttle mount configured to slideably traverse a support member positioned parallel to a plane formed by at least one printhead configured to eject in onto a surface of an object. The mount has a plurality of receptacles, each has a shape for receiving a retainer in one of a plurality of orientations. A head of each retainer is shaped to retain an edge of the object on the mount. A base of each retainer is shaped such that, when the base is pressed into a receptacle, the head assumes a desired orientation. The removable retainers retain the object on the shuttle mount.

What is also disclosed is a direct-to-object print system configured to use various embodiments of the object holder of the present invention. In one embodiment, the direct-to-object print system incorporates at least one printhead configured to eject marking material such as ink. An object holder configured to slideably traverse a support member positioned to be parallel to a plane formed by the printhead. An actuator that operatively causes the object holder to move the object along the support member in to proximity of the printhead. A controller which causes the printhead to eject marking material on to the object held by the object holder as the object moves past the printhead.

Features and advantages of the above-described apparatus and direct-to-object print system will become readily apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is an object holder for retaining an object in a direct-to-object print system, and a direct-to-object print system configured to operatively use various embodiments of the object holder of the present invention.

Non-Limiting Definitions

An "object" has at least one surface thereof to be printed with ink. Example objects are sports equipment and paraphernalia, golf clubs and balls, commemorative gifts, coffee cups, to name a few.

A "direct-to-object print system" or simply "print system" is a printer designed to print on a surface of an object. The direct-to-object print system of FIG. 1 incorporates at least the following functional components: at least one printhead, a support member, an actuator, a controller, and an object holder.

A "printhead" or "print head" is an element (such as an inkjet) which emits or ejects a droplet of marking material such as ink on to a surface of an object thereby making a mark on that object. In one embodiment, the direct-to-object print system has a plurality of monochrome printheads and a UV cure lamp. The print zone is a width of a single M-series printhead (~4 inches). Each printhead is fluidly connected to a supply of marking material (not shown). Some or all of the printheads may be connected to the same supply. Each printhead can be connected to its own supply so each printhead ejects a different marking material. A 10×1 array of printheads is shown at 104 of FIG. 1.

Figure 1:
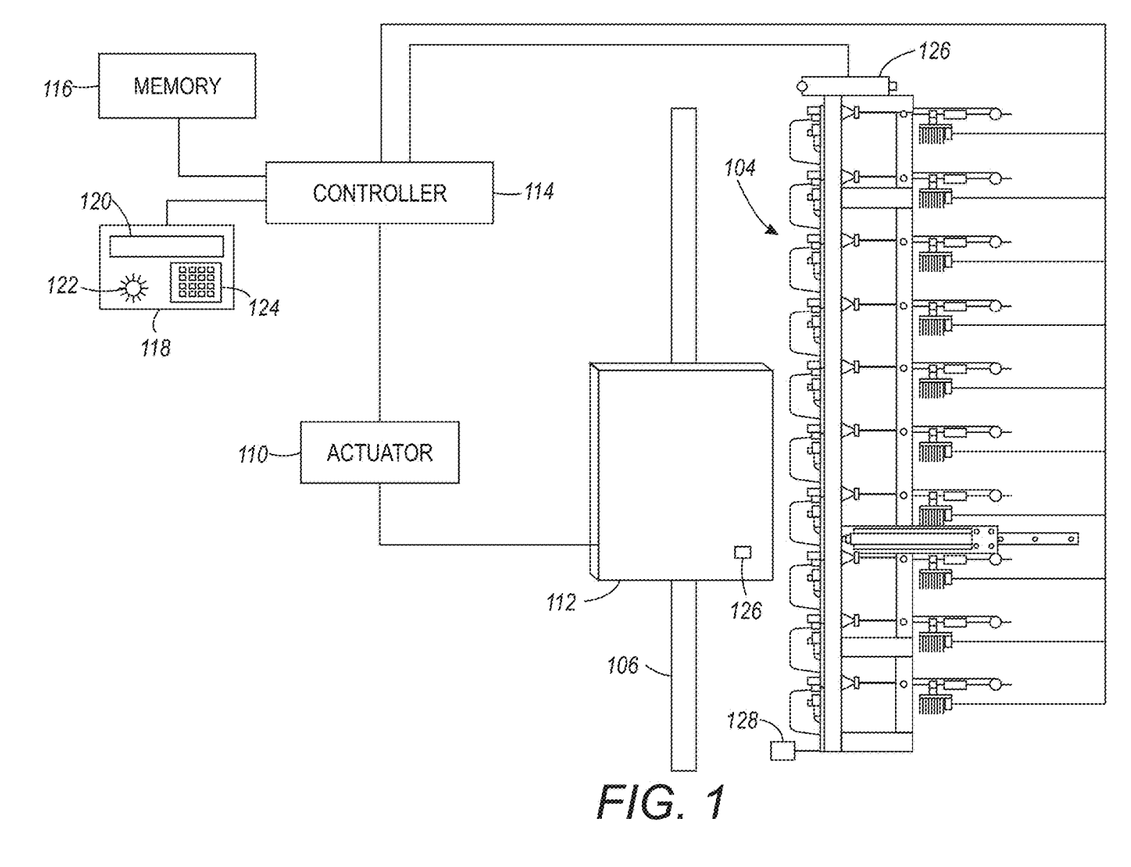
FIG. 1 illustrates one example embodiment of the direct-to-object print system disclosed herein.

A "support member", at 106 of FIG. 1, is positioned to be parallel to a plane formed by the printheads and is oriented so that one end of the support member is at a higher gravitational potential than the other end of the support member. The vertical configuration of the printheads and the support member enables the present direct-to-object print system to have a smaller footprint than a system configured with a horizontal orientation of the printheads and support member. In an alternative embodiment, a horizontal configuration orients the printheads such that the object holder moves an object past the horizontally arranged printheads.

An "actuator", at 110 of FIG. 1, is an electro-mechanical device that causes the object holder to slideably traverse the support member. In one embodiment, a controller causes the actuator to move an object holder at speeds that attenuate the air turbulence in a gap between the printhead and the surface of the object being printed.

An "object holder" physically restrains an object while the object holder is moving along the support member so that the object can pass the printhead. The object holder generally comprises a shuttle mount 112 configured to slideably traverse the support member 106. The shuttle mount has a plurality of receptacles, each having a pre-defined shape for receiving a retainer in one of a plurality of orientations relative to an edge of the shuttle mount. A plurality of removable retainers collectively retain the object while it is being moved. Each retainer has a head and a base. A head portion of each retainer is shaped to retain an edge of the object on the shuttle mount. A base portion of each retainer is shaped such that, when the base of the retainer is pressed into one of the receptacles, the head of the retainer assumes a desired orientation A "controller", at 114 of FIG. 1, is a processor or ASIC which controls various components of the present direct-to-object print system. The controller is configured to retrieve machine readable program instructions from memory 116 which, when executed, configure the controller to signal or otherwise operate the actuator 110 to move the object holder past the printheads. When other retrieved instructions are executed, the controller is configured to signal, or otherwise operate the printheads to start/stop ejecting marking material at a precise time and at a desired location on a surface of the object retained by the object holder. The controller may be further configured to operate the various printheads such that individual printheads eject different size droplets of marking material. The controller may be configured to communicate with a user interface.

A "user interface", at 118 of FIG. 1, generally comprises a display 120 such as a touchscreen, monitor, or LCD device for presenting visual information to a user, an annunciator 122 which emits an audible sound, and an input device 124 such as a keypad for receiving a user input or selection. The controller can be configured to operate the user interface to notify an operator of a failure. The controller monitors the system to detect the configuration of the printheads in the system and the inks being supplied to the printheads. If the inks or the printhead configuration is unable to print the objects accurately and appropriately then a message is presented to the user on the display of the user interface that, for example, inks need to be changed or that the printheads needs to be reconfigured. The controller can be configured to use the annunciator of the user interface to inform the operator of a system status and to attract attention to fault conditions and displayed messages. The user interface may further include a warning light.

An "identification tag", at 126 of FIG. 1, is a machine-readable indicia that is attached to the object holder. The identification tag embodies an identifier that is readable or otherwise receivable by an input device such as sensor 128. The identification tag can be fixed to the shuttle mount or a retainer. The identifier contains information about the object being printed and/or the location of the object as it traverses the support member. The received identifier is, in turn, communicated to the controller. The identification tag can be, for example, a radio frequency identification (RFID) tag with the input device being a RFID reader. The identification tag can also be a barcode with the input device being a barcode reader. In another embodiment, the identification tag comprises one or more protrusions, indentations, or combinations thereof in the object or object holder that can be detected or otherwise read by a biased arm which follows a surface of an area comprising the identification tag. In this embodiment, the biased arm is a cam follower that converts the detected protrusions, indentations, and the like position of the mechanical indicia comprising the identification tag into electrical signals which, in turn, are communicated to the controller for processing. In other embodiments, the identification tag comprises optical or electromagnetic indicia. The controller compares the identifier received from the input device to various identifiers stored in memory 116. The controller can disable operation of the actuator and/or the operation of the printheads in response to the received identifier failing to correspond to an identifier stored in the memory. The controller can also be configured to use the user interface to inform the operator of processing that needs to be performed. For example, an identification tag may indicate that an object in the object holder requires special treatment such as pre-coating prior to printing or post-coating after the object is printed. A location of the identification tag or a failure to detect an identification tag may indicate to the controller that the object held by the object holder is misaligned, has come loose, or is absent altogether. The controller, in these examples, would communicate a message to the display 120 regarding the detected condition(s).

A "sensor", at 128 of FIG. 1, is a device such as a digital camera or other imaging device positioned to generate image data by imaging, for example, a sheet of printed media with a test pattern. The controller is configured to receive the image data from the sensor and analyze the image data to identify printhead alignment, image quality, and other maintenance issues such as inoperative ejectors, low ink supply, or poor ink quality. The controller uses the user interface to notify the operation such that the operator is able to understand the reason why the controller disabled of the direct-to-object print system.

Embodiments of Object Holders

Figure 2:
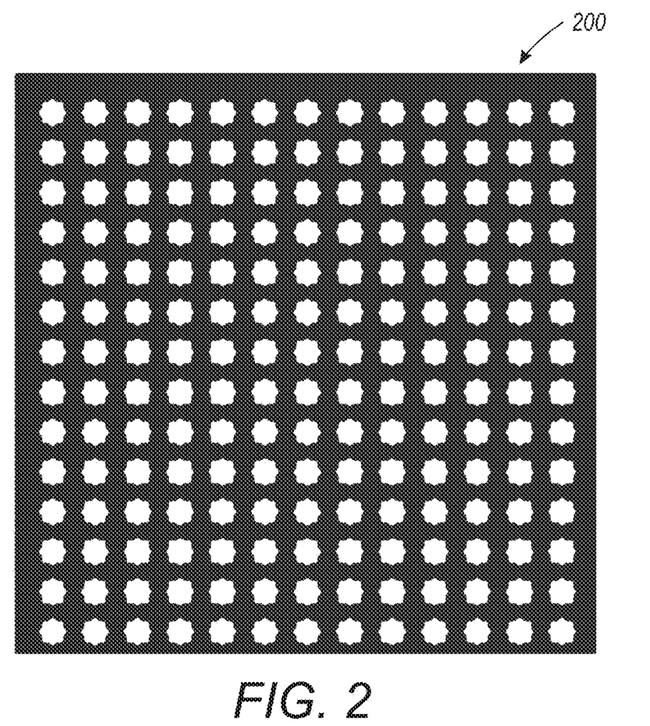
FIG. 2 shows one embodiment of the present object holder for retaining an object in a direct-to-object print system.

Reference is now being made to FIG. 2 which shows one embodiment of the present object holder for securely retaining an object while it is being printed in a direct-to-object print system. The object holder comprises, in part, a shuttle mount configured to slideably traverse the support member 106. The shuttle mount has a plurality of receptacles wherein removable retainers are inserted. In FIG. 2, the shuttle mount 200 is substantially square with a grid or pattern of geometrically shaped receptacles. The receptacles may be arranged in other patterns as desired. Each receptacle has a pre-defined shape into which a retainer is securely inserted. Each retainer has a head and a base portion. The base portion of the retainer is shaped such that, when the base of the retainer is pressed securely into one of the receptacles, the head of the retainer assumes a desired orientation. The base of the retainer can be configured to snap securely into a receptacle.

Figure 3:
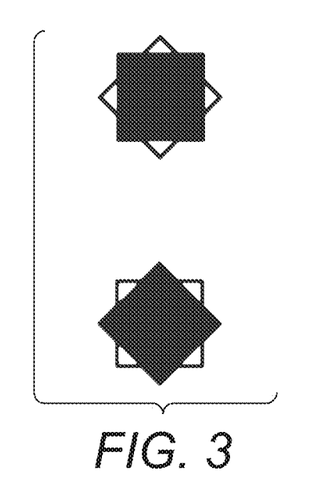
FIG. 3 shows an example retainer which has a square base that can be pressed into one of the receptacles of the shuttle mount of FIG. 2.
Figure 4:
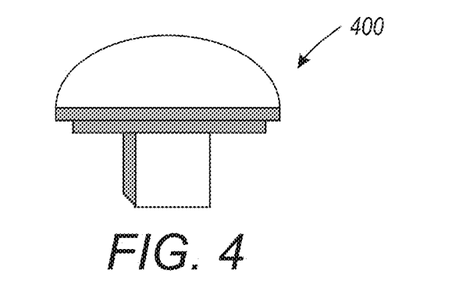
FIG. 4 shows an embodiment of a retainer with a square base and a semi-circular head portion shaped to retain an edge of the object on the shuttle mount.
Figure 5:
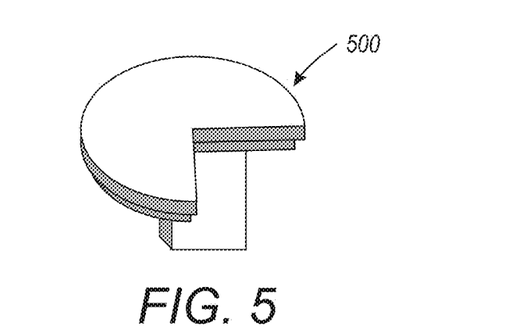
FIG. 5 shows an embodiment of a retainer with a square base and a semi-circular head portion shaped to retain a corner of the object on the shuttle mount.

Reference is now being made to FIG. 3 which shows an example retainer which has a square base that can be pressed into one of the geometrically-shaped receptacles of the shuttle mount of FIG. 2 to assume different orientations. In one embodiment, the base of the retainer and the receptacles are configure with a snap-fit mechanism in a manner such as how a socket snap-fits to an end of a ratchet. A head portion of the retainer is shaped to securely retain an edge of the object. FIGS. 4-5 show various embodiments of a retainer with a square base and a semi-circular head portion shaped to retain an edge or a corner, respectively, of an object to the shuttle mount. When pressed into a receptacle of the shuttle mount of FIG. 2, the retainers can assume different orientations relative to an edge of the shuttle mount.

Figure 6:
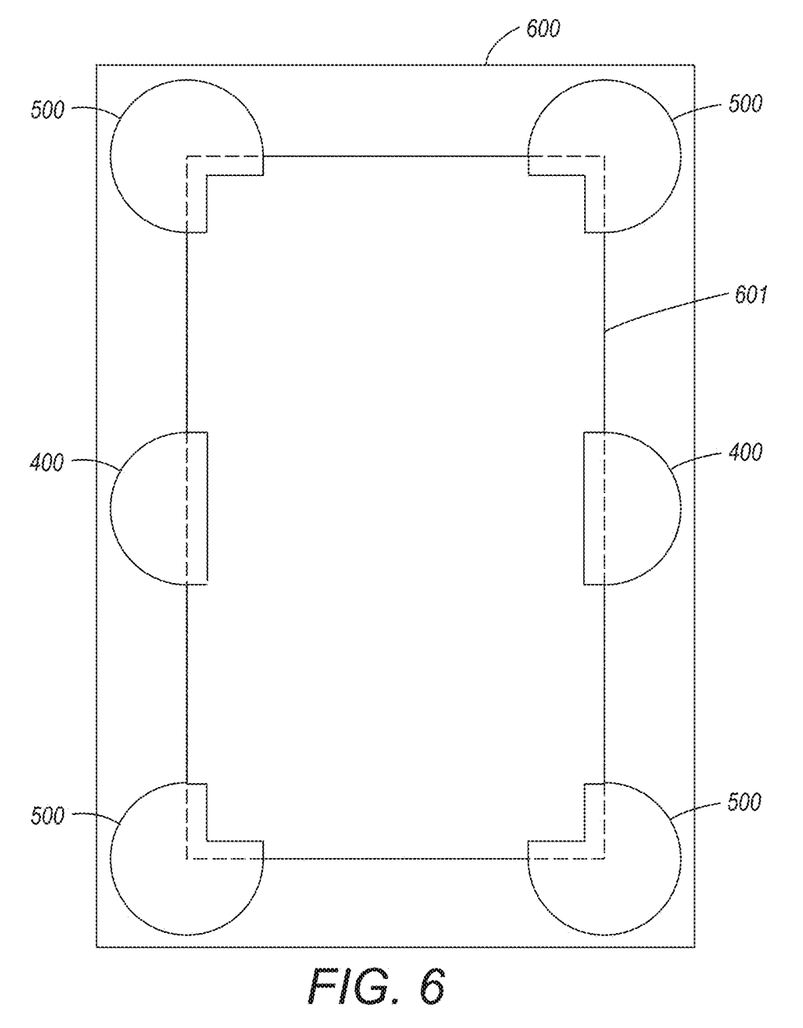
FIG. 6 shows an embodiment of an object holder having a substantially rectangular shuttle mount wherein four corner retainers and two side retainers have been inserted into respective receptacles to collectively secure the example object.
Figure 7:
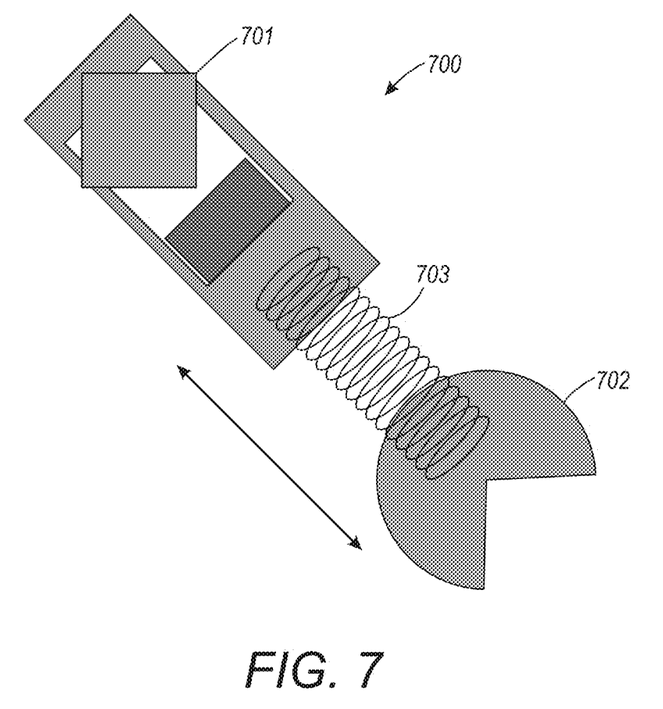
FIG. 7 shows an embodiment wherein the head of a retainer is movable along a spring-loaded shaft with the spring applying a force such that the head of the retainer is pressed against the object to help hold the object in place.

Reference is now being made to FIG. 6 which shows an object holder comprising a substantially rectangular shuttle mount 600 wherein four corner retainers 602 and two side retainers 603 have been inserted into respective receptacles to collectively retain the example object 601. Rubberized pads or pads of other materials, as well as releasable clamps, may be utilized on the head of the retainers to further support the object in the shuttle mount Reference is now being made to FIG. 7 which shows an embodiment of a retainer. Retainer 700 has a head 702 that is slideably movable (at 704) along a spring-loaded shaft 703 fixed to a base 701. In this embodiment, the spring causes the head of the retainer to forcibly press against the object to help secure the object to the shuttle mount. This embodiment facilitates removing the object from the object holder.

It should be appreciated that the embodiments shown are for explanatory purposes and should not be viewed as limiting the scope of the appended claims strictly to those embodiments. Other shaped retainers with differently shaped heads of varying heights and widths may be utilized. Rubberized pads or pads of other materials, as well as releasable clamps, may also be utilized on the retainers to further help support the object in the shuttle mount. Other embodiments include retainers made of different materials and differently shaped bases which insert into differently shaped receptacles arrayed in various configurations on differently shaped shuttle mounts. Such embodiments are intended to fall within the scope of the appended claims.

Embodiments of Direct-To-Object Print Systems

What is also disclosed is a direct-to-object print system configured to use various embodiments of the object holder of the present invention.

Figure 8:
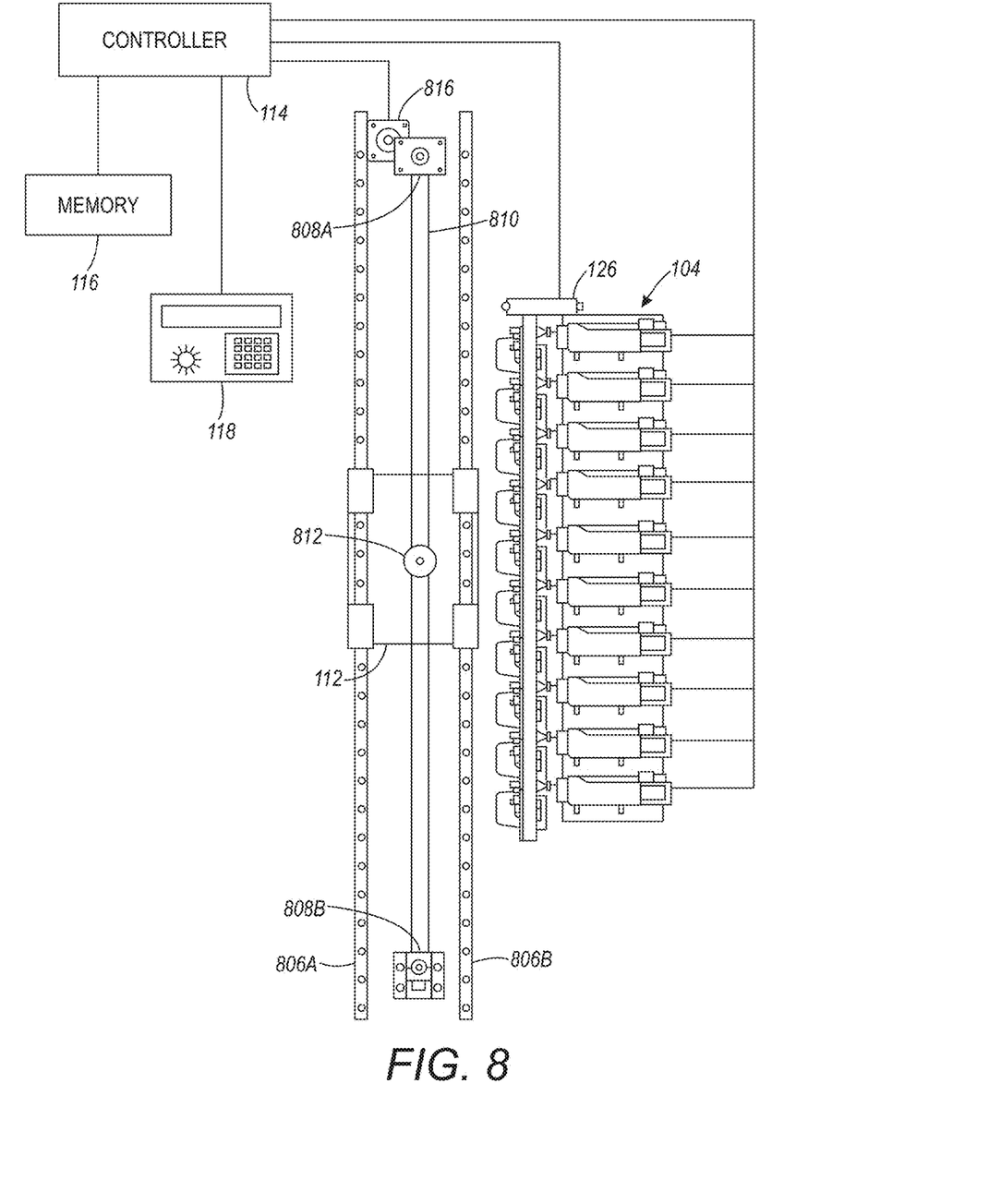
FIG. 8 shows an alternative embodiment of the direct-to-object print system of FIG. 1.

Reference is now being made to FIG. 8 which illustrates an alternative embodiment to the direct-to-object print system of FIG. 1 which uses a belt to move the object holder past the printheads. The support member comprises a pair of support members 806A and 806B about which the shuttle mount 112 is slideably attached. A pair of fixedly positioned pulleys 808A and 808B and a belt 810 form an endless belt entrained about the pair of pulleys, and a rotatable pulley 812 engages the endless belt to enable the third pulley to rotate in response to the movement of the endless belt moving about the pair of pulleys to move the object holder disclosed herein. The actuator 816 operatively rotates the drive pulley to move the endless belt about the pulleys. The controller 114 is configured to operate the actuator. The object holder of FIG. 1 has been omitted to show underlying components.

Figure 9:
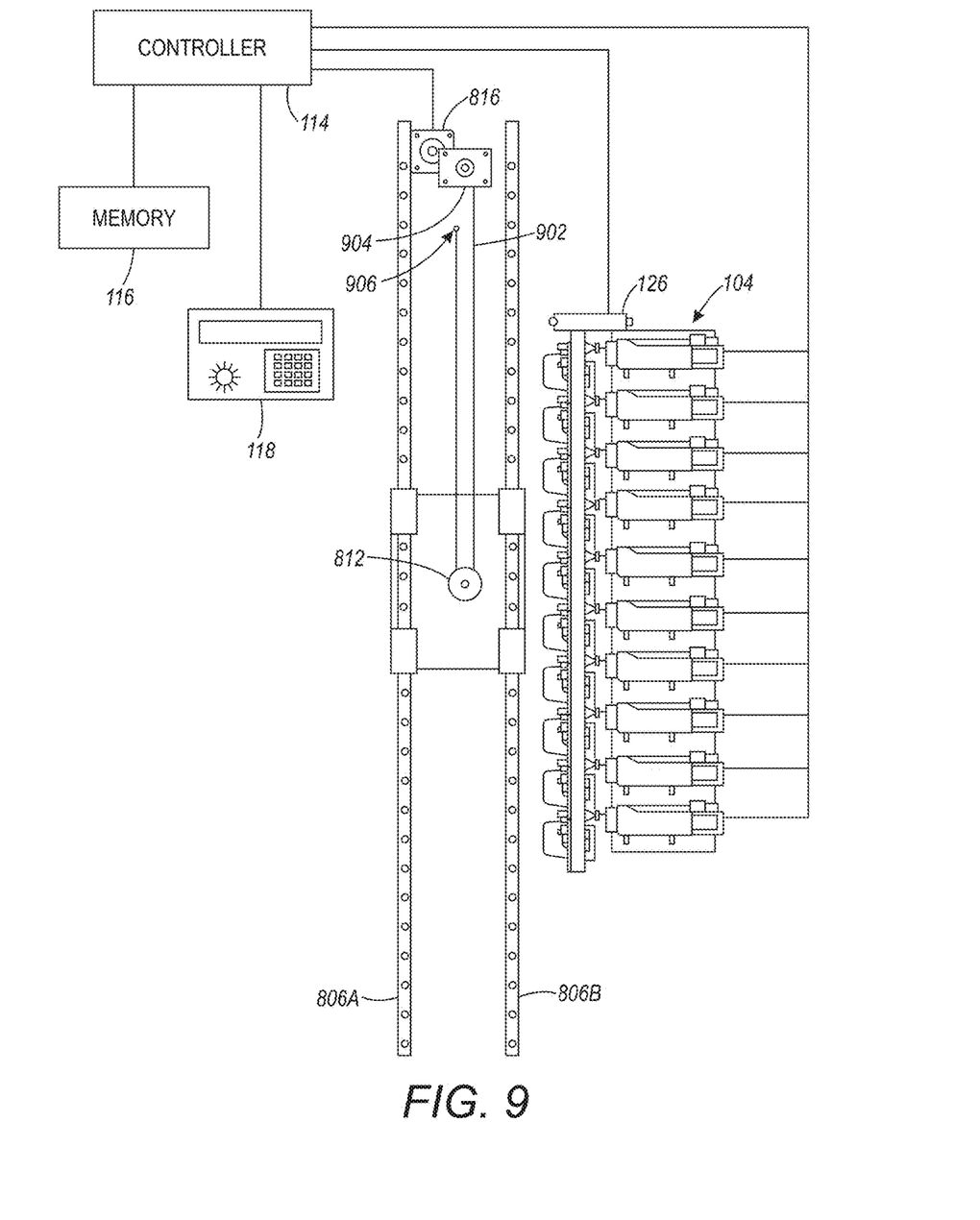
FIG. 9 shows another alternative embodiment of the direct-to-object print system of FIG. 1.

Reference is now being made to FIG. 9 which illustrates yet another embodiment of the direct-to-object print system of FIG. 1. One end of a belt 902 is operatively connected to a take-up reel 904 that is operatively connected to the actuator 816. The other end of the belt is positionally fixed at 906. The belt also engages a rotatable pulley 812 attached to the object holder. The support member comprises a pair of support members 806A and 806B about which the shuttle mount 112 is slideably attached. The actuator rotates the take-up reel to wind a portion of the length of the belt about the take-up reel to cause the object holder to move past the printheads. The actuator unwinds the belt from the take-up reel. The controller 114 is configured to operate the actuator. The object holder of FIG. 1 has been omitted to show underlying components.

Figure 10:
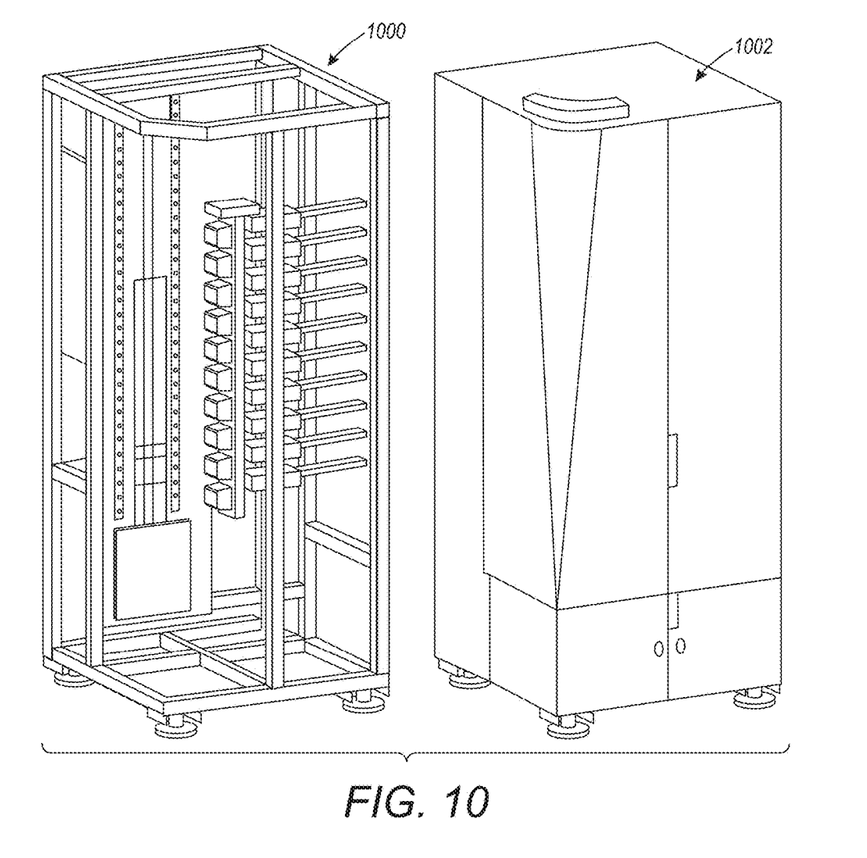
FIG. 10 show one embodiment of the present direct-to-object print system housed in a cabinet.

Reference is now being made to FIG. 10 which shows an embodiment of the present direct-to-object print system 1000 housed in a cabinet 1002. The object holder is omitted.

The direct-to-object print system disclosed herein can be placed in communication with a workstation, as are generally understood in the computing arts. Such a workstation has a computer case which houses various components such as a motherboard with a processor and memory, a network card, a video card, a hard drive capable of reading/writing to machine readable media such as a floppy disk, optical disk, CD-ROM, DVD, magnetic tape, and the like, and other software and hardware needed to perform the functionality of a computer workstation. The workstation further includes a display device, such as a CRT, LCD, or touchscreen device, for displaying information, images, classifications, computed values, extracted vessels, patient medical information, results, interim values, and the like. A user can view any of that information and make a selection from menu options displayed thereon. The workstation has an operating system and other specialized software configured to display alphanumeric values, menus, scroll bars, dials, slideable bars, pull-down options, selectable buttons, and the like, for entering, selecting, modifying, and accepting information needed for processing in accordance with the teachings hereof. The workstation can display images and information about the operations of the present direct-to-object print system. A user or technician can use a user interface of the workstation to set parameters, view/adjust/delete values, and adjust various aspects of various operational components of the present direct-to-object print system, as needed or desired, depending on the implementation. These selections or inputs may be stored to a storage device. Settings can be retrieved from the storage device. The workstation can be a laptop, mainframe, or a special purpose computer such as an ASIC, circuit, or the like.

Any of the components of the workstation may be placed in communication with any of the modules and processing units of the direct-to-object print system and any of the operational components of the present direct-to-object print system can be placed in communication with storage devices and computer readable media and may store/retrieve therefrom data, variables, records, parameters, functions, and/or machine readable/executable program instructions, as needed to perform their intended functions. The various components of the present direct-to-object print system may be placed in communication with one or more remote devices over network via a wired or wireless protocol. It should be appreciated that some or all of the functionality performed by any of the components of the direct-to-object print system can be controlled, in whole or in part, by the workstation.

The teachings hereof can be implemented in hardware or software using any known or later developed systems, structures, devices, and/or software by those skilled in the applicable art without undue experimentation from the functional description provided herein with a general knowledge of the relevant arts. One or more aspects of the systems disclosed herein may be incorporated in an article of manufacture which may be shipped, sold, leased, or otherwise provided separately either alone or as part of a product suite or a service. The above-disclosed and other features and functions, or alternatives thereof, may be desirably combined into other different systems or applications.

Presently unforeseen or unanticipated alternatives, modifications, variations, or improvements may become apparent and/or subsequently made by those skilled in this art which are also intended to be encompassed by the following claims.

What is claimed is:

1. An object holder for retaining an object in a direct-to-object print system, the object holder comprising:
   a shuttle mount configured to slideably traverse a support member positioned parallel to a plane formed by at least one printhead of a direct-to-object print system;
   a plurality of multi-pointed star-shaped receptacles in the shuttle mount for receiving a retainer in one of a plurality of orientations relative to an edge of the shuttle mount; and
   a plurality of removable retainers for collectively retaining the object while it is being moved, each retainer having a head and a base, and each retainer is one head type in a set of two or more different head types with an edge head type shaped to retain a straight edge of the object on the shuttle mount, and a corner head type shaped to retain a corner in which two or more edges of the object meet on the shuttle mount, wherein a base portion of each retainer being shaped such that, when the base of the retainer is pressed into one of the multi-pointed star-shaped receptacles, the head of the retainer assumes a desired orientation.

2. The object holder of claim 1, wherein the head of each retainer is movable along a spring-loaded shaft, the spring exerting a tension on the head of the retainer such that the head is pressed against the object.

3. The object holder of claim 1, wherein the base of the each retainer is configured to snap securely into the multi-pointed star-shaped receptacle.

4. The object holder of claim 1, wherein the plurality of multi-pointed star-shaped receptacles are arrayed in a geometric pattern.

5. The object holder of claim 1, wherein the edge head type shaped to retain a straight edge of the object on the shuttle mount further includes two half-circular members with an opening therebetween that form a clamp along the straight edge of the object.

6. The object holder of claim 1, wherein the corner head type shaped to retain a corner in which two or more edges of the object meet on the shuttle mount further includes two-circular members with a pie-shaped void, the two-circular members with an opening therebetween that form a clamp along the corner of the object.

7. The object holder of claim 6, wherein the corner head type shaped to retain a corner in which two or more edges of the object meet on the shuttle mount further includes two-circular members with a pie-shaped void, the two-circular members with an opening therebetween that form a clamp along the corner of the object.

8. A direct-to-object print system for printing on a surface of an object, the direct-to-object print system comprising:
   at least one printhead configured to eject marking material on to a surface of an object;
   a support member positioned to be parallel to a plane formed by the printhead;
   an object holder comprising:
      a shuttle mount configured to slideably traverse the support member; and
      a plurality of multi-pointed star-shaped receptacles in the shuttle mount for receiving a retainer in one of a plurality of orientations relative to an edge of the shuttle mount; and
      a plurality of removable retainers for collectively retaining the object while it is being moved, each retainer having a head and a base, and each retainer is one head type in a set of two or more different head types with an edge head type shaped to retain a straight edge of the object on the shuttle mount, and a corner head type shaped to retain a corner in which two or more edges of the object meet on the shuttle mount, wherein a base portion of each retainer being shaped such that, when the base of the retainer is pressed into one of the multi-pointed star-shaped receptacles, the head of the retainer assumes a desired orientation; and
   a controller configured to cause the printhead to eject marking material onto the object held by the object holder as the object passes the printhead.

9. The direct-to-object print system of claim 8, wherein the support member is oriented to enable one end of the support member to be at a higher gravitational potential than another end of the support member.

10. The direct-to-object print system of claim 8, wherein the controller is further configured to operate a user interface.

11. The direct-to-object print system of claim 10, wherein the user interface comprises: a display, a user input device, and an annunciator for emitting an audible sound.

12. The direct-to-object print system of claim 8, wherein the head of each retainer is movable along a spring-loaded shaft, the spring exerting a tension on the head of the retainer such that the head is pressed against the object.

13. The direct-to-object print system of claim 8, wherein the base of each retainer is configured to snap securely into the multi-pointed star-shape receptacle.

14. The direct-to-object print system of claim 8, wherein the plurality of multi-pointed star-shaped receptacles are arrayed in a geometric pattern.

15. The direct-to-object print system of claim 8, wherein the edge head type shaped to retain a straight edge of the object on the shuttle mount further includes two half-circular members with an opening therebetween that form a clamp along the straight edge of the object.

16. The direct-to-object print system of claim 8, wherein the corner head type shaped to retain a corner in which two or more edges of the object meet on the shuttle mount further includes two-circular members with a pie-shaped void, the two-circular members with an opening therebetween that form a clamp along the corner of the object.

17. The direct-to-object print system of claim 16, wherein the corner head type shaped to retain a corner in which two or more edges of the object meet on the shuttle mount further includes two-circular members with a pie-shaped void, the two-circular members with an opening therebetween that form a clamp along the corner of the object.

* * * * *